April 15, 1952 W. D. LEWIS 2,592,716

SELF-CORRECTING AMPLIFIER

Filed March 25, 1949 2 SHEETS—SHEET 1

INVENTOR
W. D. LEWIS
BY
N. S. Ewing
ATTORNEY

INVENTOR
W. D. LEWIS
BY
N. D. Ewing
ATTORNEY

Patented Apr. 15, 1952 2,592,716

UNITED STATES PATENT OFFICE 2,592,716

SELF-CORRECTING AMPLIFIER

Willard D. Lewis, Little Silver, N. J., assignor to Bell Telephone Laboratories, Incorporated, New York, N. Y., a corporation of New York Application March 25, 1949, Serial No. 83,315

8 Claims. (Cl. 179—171)

Figure 1:
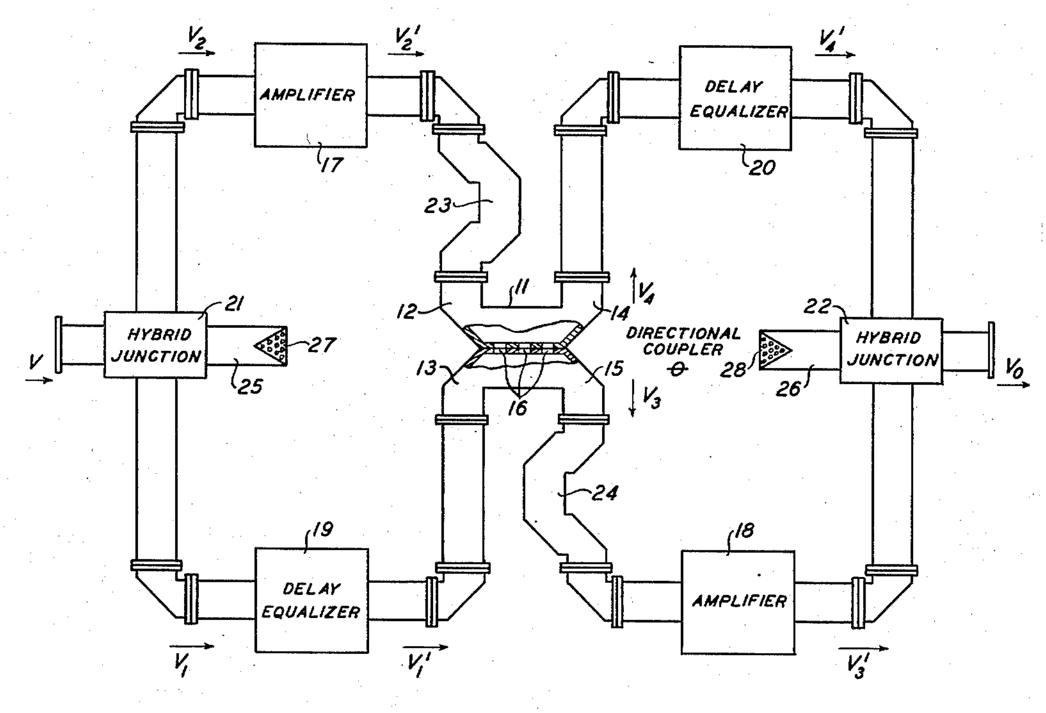

This invention relates to electric wave transmission systems and more particularly to a self-correcting microwave repeater therefor.

An object of the invention is to increase the reliability of microwave repeaters.

Another object of the invention is to increase repeater reliability without employing switching or relay circuits.

Another object of the invention is to improve the quality of repeater transmission by suppressing distortion in the repeater output circuit.

A further object of the invention is to reduce distortion without limiting band width as with previous feedback circuits.

The first-mentioned object is accomplished by providing a repeater with alternate conduction paths through separate amplifiers so that the repeater gain will remain substantially constant if one of the amplifiers should fail.

The second-mentioned object is accomplished, in one embodiment of the invention, by using a directional coupler in combination with an operating amplifier and a standby amplifier so that the output signal of the operating amplifier is combined in the directional coupler with the input signal to the standby amplifier in such phase and magnitude to substantially cancel the input signal of the standby amplifier while the operating amplifier is conducting. Upon failure of the operating amplifier, the input signal passes to the standby amplifier which carries the load at the gain of the original combination.

The third-mentioned object is accomplished in the same embodiment by utilizing the second amplifier during its standby operation to substantially cancel phase, amplitude, and non-linear distortion introduced by the operating amplifier. A portion of the distortion components present in the output of the operating amplifier is allowed to pass from the directional coupler into the input of the standby amplifier, amplified, and recombined in the repeater output to cancel the repeater distortion introduced by the operating amplifier.

The invention is particularly advantageous when used in a long chain of non-regenerative repeaters. The distortion due to each of these circuits in the chain is small. If one amplifier in the repeater circuit fails the circuit is maintained since the remaining amplifier carries on without loss in gain. This emergency feature reduces materially the chance of interruption of the chain. The increase in distortion which exists until the faulty amplifier is replaced is relatively small since it occurs at only a single repeater of the chain.

The nature of the present invention and its various objects, features and advantages, will appear more fully on consideration of the embodiments illustrated in the accompanying drawings and hereinafter to be described.

Figure 2:
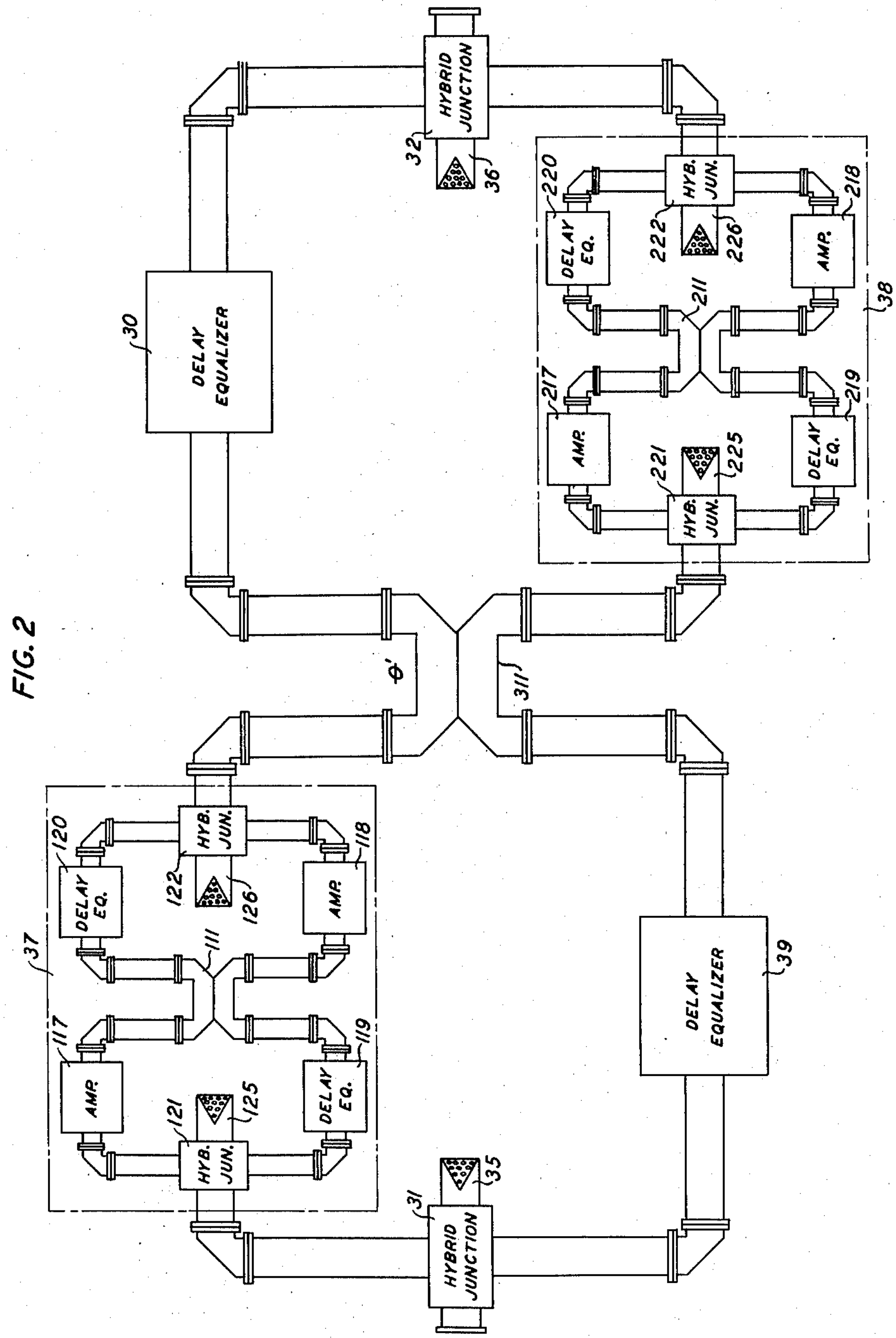

In the drawings:

Fig. 1 shows diagrammatically a self-correcting repeater circuit providing an operating conduction path and an alternate conduction path; and Fig. 2 shows a self-correcting repeater providing a plurality of alternate conduction paths.

The repeater illustrated in Fig. 1 comprises an input hybrid junction 21 having an input signal V applied thereto, a microwave amplifier 17 and a delay equalizer 19 connected to the conjugate arms thereof. The fourth arm 25, conjugate to the input arm, is terminated in accordance with usual practice in a lossy impedance-termination 27. The output of amplifier 17 is connected through a quarter wave delay section 23 to arm 12 of directional coupler 11. The output of delay equalizer 19 is connected to arm 13 of directional coupler 11. In like manner, coupler arm 14 is connected through delay equalizer 20 to a first conjugate arm of output hybrid junction 22 and coupler arm 15 is connected through delay section 24 and amplifier 18 to the second conjugate arm of output hybrid junction 22. The repeater output $V_0$ is taken from the third arm of hybrid junction 22. The fourth arm 26 of hybrid junction 22, like arm 25 of hybrid 21, is terminated in a lossy impedance-termination 27. Thus, a first transmission path is provided from junction 21 through amplifier 17, arms 12 and 14 of coupler 11, delay 20, to output junction 22. An alternate or emergency conduction path is provided from input junction 21 through delay 19, arms 13 and 15 of coupler 11, amplifier 18, to output junction 22.

The directional coupler 11 may be of the type disclosed in the United States application of W. W. Mumford, Serial No. 540,252, filed June 14, 1944, now U. S. Patent 2,562,281 issued July 13, 1951, and described in the Proceedings of the Institute of Radio Engineers, February 1947, volume 35, pages 160 to 165.

Amplifiers 17 and 18 may be microwave amplifiers of the velocity modulation type or a traveling wave amplifier of the type disclosed in United States application of J. R. Pierce, Serial No. 640,597 filed January 11, 1946, and described in the Proceedings of the Institute of Radio Engineers, February 1947, volume 35, pages 108 to 111, or a closely spaced triode amplifier of the type disclosed in United States application of J. A. Morton-R. L. Vance Serial No. 572,596, filed January 13, 1945, now U. S. Patent 2,502,530, issued April 4, 1950.

Delay equalizers 19 and 20 may be of any of the common delay of phase equalizer types, for example the type disclosed in United States patent application of A. G. Fox, Serial No. 452,851 filed July 30, 1942, now U. S. Patent 2,432,093, issued December 9, 1947, or the type disclosed in United States patent application of W. D. Lewis-L. C. Tillotson, Serial No. 789,986 filed December 5, 1947, now U. S. Patent 2,520,288, issued June 6, 1950, or W. D. Lewis, Serial No. 789,985 filed December 5, 1947.

Wave-guide branching circuits or hybrid junctions 21 and 22 may be of the type disclosed in United States Patent No. 2,445,896 issued to W. A. Tyrrell, July 27, 1948 and described in the Proceedings of the Institute of Radio Engineers, November 1947, volume 35, pages 1294 to 1306, or of the type disclosed in detail in the joint application of the applicant and H. T. Friis and L. C. Tillotson, Serial No. 789,850 filed December 5, 1947, now Patent No. 2,575,804 issued November 20, 1951, and described in the Bell System Technical Journal, January 1948, volume 27, pages 83 to 95.

Referring particularly to directional coupler 11 as shown diagrammatically in Fig. 1, it is well known that energy entering an arm of the directional coupler will divide between the opposite arms in the ratio of cos $\theta$ : sin $\theta$, where $\theta$ is the function angle of small magnitude depending directly upon the physical dimensions of the coupling holes. It is likewise known that no energy will be coupled from one arm into the adjacent, conjugate arm thereof. In other words, the magnitude of the energy entering arm 12 that will appear in arm 14 is proportional to cos $\theta$ and that appearing in arm 15 to sin $\theta$ with no energy coupled into arm 13, and the magnitude of the energy entering arm 13 that will appear in arm 15 is proportional to cos $\theta$ and in arm 14 to sin $\theta$ with no energy coupled into arm 12.

Applicant has found that, in addition to this division depending upon the coupling holes, the energy which passes through the holes undergoes a phase shift of 90 degrees or one-quarter wavelength. For example, energy coupled into arm 15 due to a signal applied to arm 12 will undergo a 90-degree phase shift with respect to that portion of the energy passed to arm 14.

The importance of this feature in accomplishing the objects of the invention will readily be understood from the following analysis of a specific embodiment of the invention as shown in Fig. 1.

Allow an input wave of magnitude V to be applied to the input hybrid junction 21. Input wave V divides into the conjugate arms of input hybrid 21 into two waves, each with half the power, and with the same phase relation. These waves are designated on Fig. 1 as $V_1$ and $V_2$, and each will have the value of $$\frac{V}{\sqrt{2}}$$

Wave $V_2$ is applied to microwave amplifier 17 which is adjusted to have a gain $$G_0 = \cot\theta \tag{1}$$

The reasons for the selection of this value of gain relative to $\theta$ will immediately become evident. The output $V_2'$ of amplifier 17 therefore is equal $$\frac{V}{\sqrt{2}}\cot\theta$$

Wave $V_2'$ passes through quarter wave delay section 23, where it undergoes a 90-degree phase shift, and into arm 12 of directional coupler 11.

Wave $V_1$ is applied to delay equalizer 19 which is assumed to have no loss and which has a delay characteristic substantially equal to the ideal value of the delay of amplifier 17. Output wave $V_1'$ of equalizer 19 therefore retains a value of $$\frac{V}{\sqrt{2}}$$

and has the same phase relation as $V_2'$. $V_1'$ is applied to arm 13 of directional coupler 11.

In the manner described, $V_1'$ divides into arms 14 and 15, and $V_2'$ divides into arms 15 and 14 in the ratio of sin $\theta$: cos $\theta$, respectively. The total energy in each of arms 14 and 15 becomes the sum of the respective components obtained from wave $V_1'$ and wave $V_2'$ taking relative phase shifts into account.

It is evident, therefore, that the magnitude of the energy appearing in arm 14 may be expressed $$V_4 = \frac{V}{\sqrt{2}}(\cot\theta\cos\theta + \sin\theta) \tag{2}$$

and the magnitude of the energy appearing in arm 15 may be expressed $$V_3 = \frac{V}{\sqrt{2}}(\cos\theta - \cot\theta\sin\theta) \tag{3}$$

or equal to zero, wherein the minus sign accounts for the 180-degree phase reversal with respect to $V_1'$ of the energy due to $V_2'$ introduced by the 90-degree phase shift of the quarter wave section 23 and the additional 90-degree phase shift introduced by pasing through the coupling holes 16.

Thus, by the selection of amplifier gain $G_0 = \cot\theta$, all components of input wave V are substantially canceled in arm 15, leaving wave $V_3$ of magnitude zero, and amplifier 18 operating in standby condition at substantially no load.

$V_4$, the energy leaving arm 14, is applied to delay equalizer 20, identical to delay equalizer 19, and becomes $V_4'$. Since equalizer 20 is assumed to have no loss, then $V_4' = V_4$. Output hybrid junction 22, which may be identical to input junction 21, combines energy of waves $V_3'$ and $V_4'$ applied to its conjugate arms in the relation $$V_0 = \frac{1}{\sqrt{2}}(V_3' + V_4')$$

wherein $V_0$ is the output energy of the junction. However, since $V_3$ is zero, $V_3'$ must be zero and $$V_0 = \frac{V}{2}(\cot\theta\cos\theta + \sin\theta) \tag{4}$$

Since cot $\theta = G_0$ is a large quantity, $\theta$ being an angle of small magnitude, cas $\theta \approx 1$ and sin $\theta \approx 0$, the repeater output becomes $$V_0 \approx \frac{V}{2}G_0 \tag{5}$$

In accordance with an object of the invention the repeater gain will remain constant if the operating amplifier should fail, as will appear from the following considerations.

Assume that operating amplifier 17 fails. The coupler outputs as previously represented by Equations 2 and 3 will become $$V_4 = V_4' = \frac{V}{\sqrt{2}} \sin \theta \qquad (6)$$

and $$V_3 = \frac{V}{\sqrt{2}} \cos \theta \qquad (7)$$

$V_3$ is applied through quarter wave section 24, the purpose of which will later become apparent, to amplifier 18, which has a gain $G_0$ equal that initially provided by amplifier 17. Output $V_3'$ of amplifier 18 becomes $$\frac{V}{\sqrt{2}} G_0 \cos \theta$$

Combining $V_3'$ and $V_4'$ in junction 22 as before, an output wave is obtained $$V_0 = \frac{V}{2}(G_0 \cos \theta + \sin \theta) \qquad (8)$$

Assuming again that $\cos \theta \approx 1$ and $\sin \theta \approx 0$, $$V_0 \approx \frac{V}{2} G_0 \qquad (9)$$

which gives a repeater gain through standby amplifier 18 identical to the gain of the original combination as may be seen by comparing Equations 4 and 5 with Equations 8 and 9, respectively.

In accordance with an object of the invention, the self-correcting repeater will cancel phase, amplitude and non-linear imperfections introduced by the amplifier. This object is accomplished by the configuration already described by comparing the output $V_2'$ of operating amplifier 17 in directional coupler 11 with distortion-free component $V_1'$. The difference $V_3$, which represents distortion introduced by amplifier 17, is amplified by standby amplifier 18 and recombined in junction 22 in such phase and magnitude as to substantially cancel distortion present in repeater output $V_0$.

To illustrate this feature, it is assumed that amplifier 17 has gain $$G_1 = G_0 + e_1 G_0$$

and amplifier 18 has gain $$G_2 = G_0 + e_2 G_0$$

where $G_0$ is a large constant quantity and $e_1$, $e_2$ are small with respect to unity and represent the imperfections of the amplifier characteristic with respect to amplitude, phase and compression. The argument has been simplified by omitting terms representing linear phase characteristics which are compensated by the delay equalizer circuits so that the results are unaffected by this omission.

It is evident that the distortion components coupled into the standby path will not be cancelled in arm 15 of directional coupler 11 as are the signal components in the manner already described. Rather $V_3$ becomes the distortion introduced by amplifier 17 isolated from the signal components. By the addition of the quarter wave section 24 in the standby path, the isolated distortion is caused to be 180 degrees out of phase with the distortion components in $V_4$.

This isolated distortion may be expressed as $$-\frac{V}{\sqrt{2}} \cos \theta e_1$$

wherein the minus sign accounts for the phase reversal with respect to $V_4$, and upon being amplified by the lightly loaded amplifier 18, becomes $$V_3' = -\frac{V}{\sqrt{2}} G_0 \cos \theta e_1 - \frac{V}{\sqrt{2}} G_0 \cos \theta e_1 e_2 \qquad (10)$$

The signal in the operating path, also containing a distortion component, may be represented as $$V_4' = \frac{V}{\sqrt{2}}(G_0 \cos \theta + \sin \theta) + \frac{V}{\sqrt{2}} G_0 \cos \theta e_1 \qquad (11)$$

Upon combination of $V_3'$ and $V_4'$ in junction 22, it is evident that the distortion component contained in $V_4'$ will be canceled. Upon simplification assuming $\cos \theta \approx 1$ and $\sin \theta \approx 0$, output voltage of the repeater becomes $$V_0 \approx \frac{V}{2} G_0 (1 - e_1 e_2) \qquad (12)$$

which represents an amplifier with an error of the second order where the error of the constituent amplifiers are of the first order.

This result indicates, for example, that if amplitude distortion in the individual amplifiers is 10 per cent it is reduced to 1 per cent by the invention as shown in Fig. 1. A similarly beneficial result is found for phase distortion. For non-linear compression, the effect of the circuit is even more beneficial, since the second amplifier is loaded very lightly and $e_2$ should be very small.

By similar analysis it is found that upon failure of the first amplifier, the output voltage is $$V_0 \approx \frac{V}{2} G_0 (1 + e_2) \qquad (13)$$

When the second amplifier fails, we have similarly the output voltage $$V_0 \approx \frac{V}{2} (1 + e_1) \qquad (14)$$

These equations indicate that when either amplifier fails the combination continues to operate at the same gain, but with the entire distortion of the operating amplifier.

The quarter wave delay sections 23 and 24 have been illustrated in Fig. 1 merely to facilitate an explanation of the operating principles of the invention. It is evident, however, that any apportionment of relative delay through the separate conduction paths will suffice which provides a phase difference of an odd-multiple of quarter wavelengths between the conduction paths from hybrid junction 21 to directional coupler 11 through amplifier 17 and through equalizer 19 respectively or substantial phase subtraction of the signals combined in arm 15 applied from arms 12 and 13, and an equal phase delay for the total conduction paths from input junction 21 to output junction 22 through amplifier 17 and through amplifier 18, respectively. These requirements may be met by any number of waveguide configurations. For specific example, delay equalizers 19 and 20 may be chosen to have a delay characteristic one-quarter wavelength less than the respective amplifiers 17 and 18, at the same time maintaining the delay through other components of the respective paths equal.

A further embodiment of the invention is illustrated in Fig. 2 which shows a repeater design providing a plurality of conduction paths through several standby amplifiers. The component configuration including amplifiers 117 and 118 enclosed in box 37 comprises a repeater identical to that shown and discussed in relation to Fig. 1. Likewise, the component configuration including amplifiers 217 and 218 enclosed in box 38 also comprises a repeater identical to that shown and discussed in relation to Fig. 1.

Directional coupler 311, which may be of the same type as coupler 11, is indicated as having a function angle $\theta'$. Hybrid junctions 31 and 32 may be identical to junctions 21 and 22, respectively, and are terminated in the lossy impedance arms 35 and 36, respectively. Delay equalizers 30 and 39 may be of the type indicated for delay equalizers 20 and 19.

Thus, a microwave repeater having four conduction paths through four alternate amplifiers is provided having a configuration somewhat similar to the repeater shown in Fig. 1. A first conduction path is provided from input hybrid junction 31 through junction 121, amplifier 117, coupler 111, delay equalizer 120, junction 122, coupler 311, delay equalizer 30 to output hybrid junction 32. In like manner, second, third and fourth conduction paths are provided through amplifiers 118, 217 and 218, respectively.

Regarding the component combinations 37 and 38 each as a single "amplifier" having a gain $$\frac{G_0}{2}$$

the four-conduction path repeater as shown in Fig. 2 may be analyzed by employing the fundamental principles of the invention as taught in relation to Fig. 1. Directional coupler 311 is chosen so that cot $$\theta'=\frac{G_0}{2}$$

Delay equalizers 30 and 39 are chosen to have the proper relative phase delay with respect to "amplifiers" 38 and 39, respectively. As pointed out before, this may be satisfactorily accomplished by apportioning a delay characteristic to the path through delay equalizers 30 and 39 an odd-multiple of quarter wavelengths less than the respective paths through "amplifiers" 38 and 37.

A microwave repeater is thus obtained having four alternate conduction paths and affording a system gain of $$\frac{G_0}{4}$$

Initially, the load is carried by amplifier 117, the remainder of the amplifiers operating in stand-by condition. Upon failure of amplifier 117 the load is subsequently carried by 118. In like manner, amplifiers 217 and 218 are available for emergency operation upon failure of the preceding amplifier. Any combination of one or more operating amplifiers will afford a system gain of $$\frac{G_0}{4}$$

If amplifiers 117, 118, 217 and 218 introduce a distortion component $e_1$, $e_2$, $e_3$ and $e_4$, respectively, the system output upon the application of an input signal V will be $$V_0=\frac{V}{4}G_0(1+e_1e_2e_3e_4) \qquad (15)$$

Thus the error has been reduced to the fourth order in comparison to a single amplifier error. Upon failure of any one, two or three amplifiers, the distortion produced by the remaining combination will be the third, second, or first order, respectively.

In similar manner, the configuration may be extended in accordance with the invention to incorporate an additional plurality of amplifiers providing an equal number of alternate conduction paths, concurrently reducing the system distortion to a substantially negligible amount.

The principles and theory of the invention as illustrated are not limited to any patricular mode or modes of operation of the wave guides or wave-guide components but apply equally to components excited in the dominant mode as well as higher order modes of operation.

The principles of the invention may be practiced in coaxial systems by the use of coaxial directional couplers, for example, as disclosed in United States application of W. W. Mumford, Serial No. 540,252, filed June 14, 1944, now U. S. Patent 2,562,281 issued July 31, 1951, and known types of coaxial amplifiers.

It is to be understood that the above-described arrangements are illustrative of the application of the principles of the invention. Numerous other arrangements may be devised by those skilled in the art without departing from the spirit and scope of the invention.

What is claimed is:

1. A microwave repeater comprising a signal input circuit, a signal output circuit, a primary conduction path and at least one secondary conduction path connected between said input circuit and said output circuit, separate amplifiers having equal gain included in each of said conduction paths, and means for substantially canceling the input signal to said amplifier in said secondary path while said primary path conducts, said means comprising a directional coupler connected in common with the output circuit of said primary amplifier and the input circuit of said secondary amplifier.

2. A microwave repeater comprising an input hybrid junction, an output hybrid junction, a first conduction path connected from said input junction to said output junction, a directional coupler included in said first path, a first amplifier means included in said first path preceding said coupler, a second conduction path connected from said input junction to said output junction, said second path including said directional coupler, a second amplifier means having equal amplifying capacity to said first amplifier means included in said second path following said directional coupler, the electrical length of said first path preceding said coupler adjusted with respect to the electrical length of said second path preceding said coupler whereby the signal components from said first path substantially combine to cancel signal components in said second path.

3. A microwave repeater, comprising an input hybrid junction, an output hybrid junction, a first wave-guide conduction path from said input junction to said output junction, a second wave-guide conduction path from said input junction to said output junction, a portion of said first wave guide laterally contiguous to said second wave guide, each of said guides having a plurality of spaced apertures in said portion, said apertures in one guide being contiguous with the apertures in the other guide, a first amplifier means included in said first path preceding said portion, a second amplifier means included in said second path following said portion, the electrical length of said first path from said input junction to said output junction being substantially equal the electrical length of said second path from said input junction to said output junction, and the electrical length of said first path preceding said portion being substantially an odd multiple of one-quarter wavelengths different from the electrical length of said second path preceding said portion.

4. A microwave repeater comprising an input hybrid junction having first and second output branches, a directional coupler having first and second input branches and first and second output branches, an output hybrid junction having first and second input branches, a first amplifier means connected between the first of said input junction output branches and the first of said coupler input branches, a first delay circuit connected between the second of said input junction output branches and the second of said coupler input branches, a second amplifier means connected between the first of said coupler output branches and the first of said output junction input branches, and a second delay circuit connected between the second of said coupler output branches and the second of said output junction input branches.

5. A microwave amplifier comprising an input hybrid junction having two output connections, the first output connection thereof connected to the input connection of a microwave amplifier means, the second output connection thereof connected to a delay circuit having a delay substantially equal to the delay of said amplifier means, a directive coupler for combining the output of said amplifier means and the output of said delay circuit to obtain a difference component representing only the distortion introduced by said amplifier means and a sum component representing the amplified signal including distortion, and means for amplifying and means for combining said difference component with said sum component in such phase as to substantially cancel said distortion components introduced by said amplifier means.

6. A microwave repeater comprising a signal input circuit, a signal output circuit, a primary conduction path connected from said input circuit to said output circuit, at least one secondary conduction path connected from said input to said output circuit, wave-guide sampling means for deriving a sample of the signal in said primary path, wave-guide inserting means for injecting said sample into said secondary path at an electrical point in said secondary path, the electrical length from said input circuit to said point measured through said primary path and said sampling means and said inserting means being 180 electrical degrees different from the electrical length from said input circuit to said point measured through said secondary path, whereby said sample inserted into said secondary path substantially cancels transmission through said secondary path.

7. A microwave repeater comprising a signal input circuit, a signal output circuit, a primary conduction path connected from said input circuit to said output circuit, at least one secondary conduction path connected from said input circuit to said output circuit, a wave-guide structure connected in common to both said paths, said structure adapted to sample a portion of a signal in said primary path and to insert said sample into said secondary path, a first microwave amplifier including in said primary path between said input circuit and said common wave-guide structure, a second microwave amplifier having a gain equal to that of said first amplifier included in said secondary path between said common wave-guide structure and said output circuit.

8. A microwave repeater comprising a signal input circuit, a signal output circuit, a first conduction path connected from said input circuit to said output circuit, a first four terminal wave-guide structure having two terminals thereof included in said first path, a second conduction path connected from said input circuit to one remaining terminal of said first structure, a third conduction path connected from the other remaining terminal of said first structure to said output circuit, a second four terminal wave-guide structure having two terminals thereof included in said third path, and a fourth conduction path connected from said other terminal of said first structure to said output circuit and including the remaining terminals of said second structure.

WILLARD D. LEWIS.

REFERENCES CITED

The following references are of record in the file of this patent:

UNITED STATES PATENTS

| Number | Name | Date |
|---|---|---|
| 2,129,669 | Bowen | Sept. 13, 1938 |
| 2,153,728 | Southworth | Apr. 11, 1939 |
| 2,229,089 | Kinsbury | Jan. 21, 1941 |
| 2,229,090 | Kinzer | Jan. 21, 1941 |
| 2,229,108 | Maggie et al. | Jan. 21, 1941 |
| 2,229,158 | Wilson | Jan. 21, 1941 |
| 2,250,934 | Ohl | July 29, 1941 |
| 2,375,223 | Hansen | May 8, 1945 |
| 2,416,790 | Barrow | Mar. 4, 1947 |